(12) United States Patent
Sun et al.

(10) Patent No.: US 12,034,663 B2
(45) Date of Patent: Jul. 9, 2024

(54) AP-SRS TRIGGERING OFFSET ENHANCEMENT FOR FURTHER ENHANCED MIMO

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Yushu Zhang, Beijing (CN); Hong He, San Jose, CA (US); Chunxuan Ye, San Diego, CA (US); Huaning Niu, San Jose, CA (US); Weidong Yang, San Diego, CA (US); Oghenekome Oteri, San Diego, CA (US); Seyed Ali Akbar Fakoorian, San Diego, CA (US); Sigen Ye, Whitehouse Station, NJ (US); Chunhai Yao, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,152

(22) PCT Filed: Jan. 15, 2021

(86) PCT No.: PCT/CN2021/072030
§ 371 (c)(1),
(2) Date: Sep. 20, 2021

(87) PCT Pub. No.: WO2022/151315
PCT Pub. Date: Jul. 21, 2022

(65) Prior Publication Data
US 2023/0361952 A1 Nov. 9, 2023

(51) Int. Cl.
*H04L 5/00* (2006.01)
*H04W 72/23* (2023.01)

(52) U.S. Cl.
CPC ............ *H04L 5/0048* (2013.01); *H04W 72/23* (2023.01)

(58) Field of Classification Search
CPC .... H04L 5/0048; H04L 5/0051; H04W 72/23; H04B 7/2656
See application file for complete search history.

(56) References Cited

U.S. PATENT DOCUMENTS

2020/0412581 A1* 12/2020 Zhang .................... H04W 72/23
2023/0114925 A1* 4/2023 Yang ...................... H04L 5/0091
370/329

FOREIGN PATENT DOCUMENTS

CN 110324124 A 10/2019
CN 110650001 A 1/2020
(Continued)

OTHER PUBLICATIONS

International Search Report and Written Opinion of the International Searching Authority directed to related International Patent Application No. PCT/CN2021/072030, dated Oct. 20, 2021; 9 pages.

(Continued)

*Primary Examiner* — Thai Nguyen
(74) *Attorney, Agent, or Firm* — Sterne, Kessler, Goldstein & Fox P.L.L.C.

(57) ABSTRACT

The present disclosure is directed to AP-SRS triggering offset enhancement for further enhanced MIMO. User equipment (UE), base stations, apparatus, methods, computer-readable memory media, and computer program products are disclosed. The UE may be configured to receive an offset information associated with AP-SRS transmission of the UE; determine a slot offset associated with the AP-SRS transmission, at least based on the offset information; determine a specific slot for the AP-SRS transmission, based on (Continued)

the determined slot offset; and perform the AP-SRS transmission in the determined specific slot.

20 Claims, 9 Drawing Sheets

(56) References Cited

FOREIGN PATENT DOCUMENTS

| CN | 111245587 A | 6/2020 |
|---|---|---|
| WO | WO 2019/213914 A1 | 11/2019 |
| WO | WO 2020/084362 A1 | 4/2020 |
| WO | WO-2022132398 A1 * | 6/2022 |

OTHER PUBLICATIONS

Sony, "Summary of SRS," 3 GPP TSG RAN WIG Meeting #94, R1-1809814, Aug. 24, 2018; Retrieved Nov. 18, 2021; 63 pages.

* cited by examiner

| Method | Option 1 | Option 2 | Option 3 | Option 4 |
|---|---|---|---|---|
| Method 1: semi-statically changed by RRC/SIB, via tdd-UL-DL-ConfigurationCommon | Yes | Yes | Yes | Yes |
| Method 2: semi-statically changed by RRC, via tdd-UL-DL-ConfigurationDedicated | Yes | No | Yes | Yes |
| Method 3: Dynamically changed by dynamic SFI, i.e., DCI Format 2_0 | No | No | Yes | Yes |
| Method 4: Dynamically changed by dynamic DCI, i.e., DCI Format 1_0, 1_1, 1_2, 2_0, 2_1, 2_2 | No | No | No | Yes |

AP-SRS TRIGGERING OFFSET ENHANCEMENT FOR FURTHER ENHANCED MIMO

CROSS-REFERENCE TO RELATED APPLICATION

This application is a U.S. National Phase of International Application No. PCT/CN2021/072030, filed Jan. 15, 2021, which is hereby incorporated by reference in its entirety.

FIELD

The present application relates to wireless communication, and more particularly to user equipment (UE), base stations, apparatus, methods, computer-readable memory media, and computer program products for providing Aperiodic Sounding Reference Signal (AP-SRS) triggering offset enhancement for further enhanced Multiple-Input-Multiple-Output (MIMO).

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired. For example, dynamic triggering of AP-SRS transmission may be desired.

SUMMARY

Embodiments relate to UE, base stations, apparatus, methods, computer-readable memory media, and computer program products for providing AP-SRS triggering offset enhancement for further enhanced MIMO.

According to one aspect of the disclosure, a user equipment (UE) is provided. The UE comprises at least one antenna; at least one radio coupled to the at least one antenna; and a processor coupled to the at least one radio. The UE is configured to: receive an offset information associated with AP-SRS transmission of the UE; determine a slot offset associated with the AP-SRS transmission, at least based on the offset information; determine a specific slot for the AP-SRS transmission based on the determined slot offset; and perform the AP-SRS transmission in the determined specific slot.

According to another aspect of the disclosure, a base station is provided. The base station comprises at least one antenna, at least one radio coupled to the at least one antenna, and a processor coupled to the at least one radio. The base station is configured to determine a specific slot for AP-SRS transmission of a UE, determine a slot offset between the specific slot and a reference slot, and send to the UE, an offset information that is associated with the determined slot offset.

According to other aspects of the disclosure, apparatus, methods, computer-readable memory media, and computer program products for operating the UE or the base station are disclosed.

According to the techniques described herein, a base station may provide an offset information associated with AP-SRS transmission to a UE. The offset information may indicate a slot offset associated with the AP-SRS transmission of the UE. The slot offset may indicate a specific slot that is allocated by the base station for the UE to perform the AP-SRS transmission. Upon receiving the offset information, the UE may determine the allocated specific slot and perform the AP-SRS transmission in the specific slot. The offset information may be provided via Downlink Configuration Information (DCI) and/or RRC signaling. Thus, the techniques described herein may be used to support AP-SRS triggering offset enhancement for further enhanced MIMO, at least according to some embodiments.

The techniques described herein may be implemented in and/or used with a number of different types of devices, including but not limited to cellular phones, tablet computers, wearable computing devices, portable media players, various base stations and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
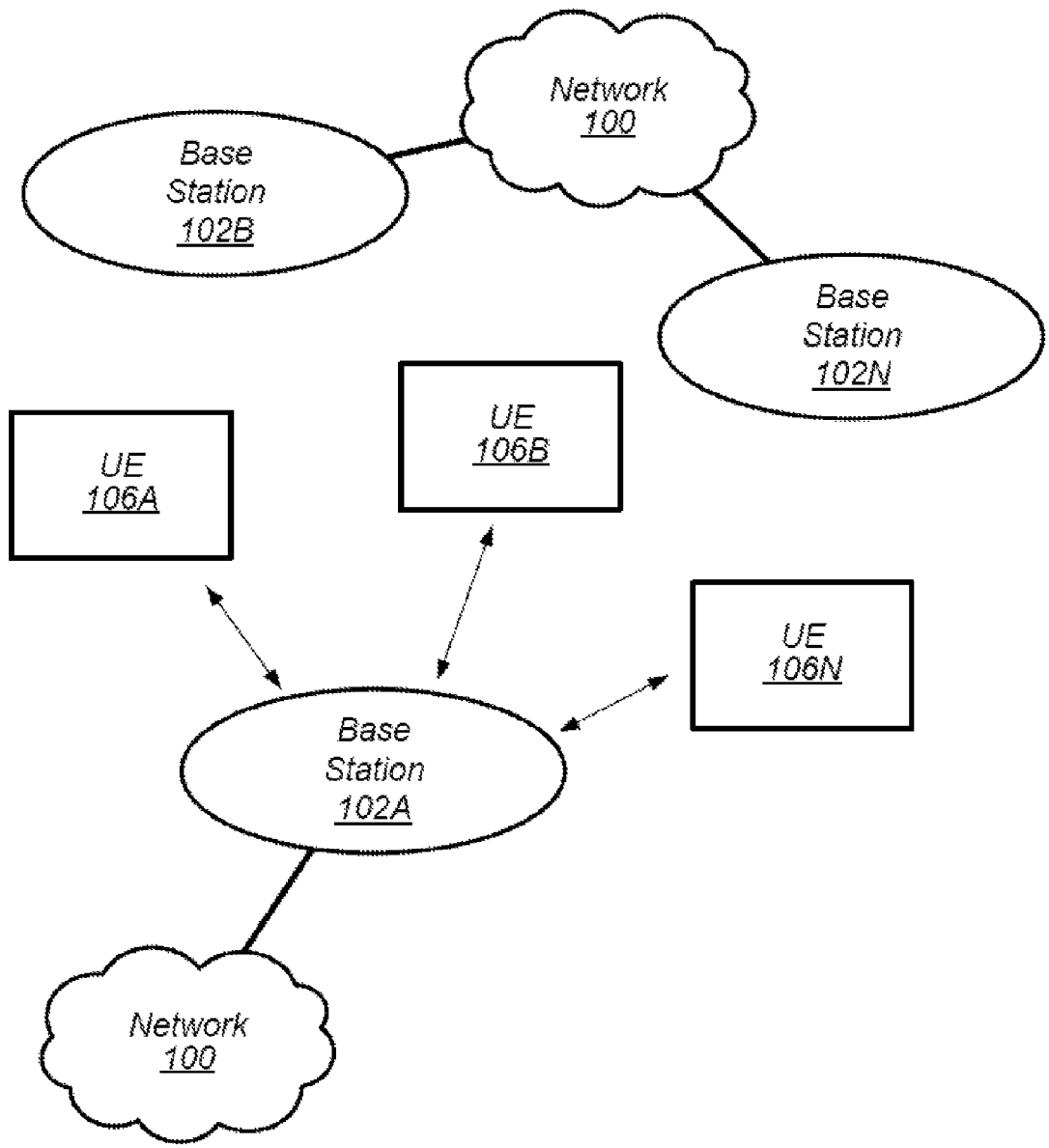
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
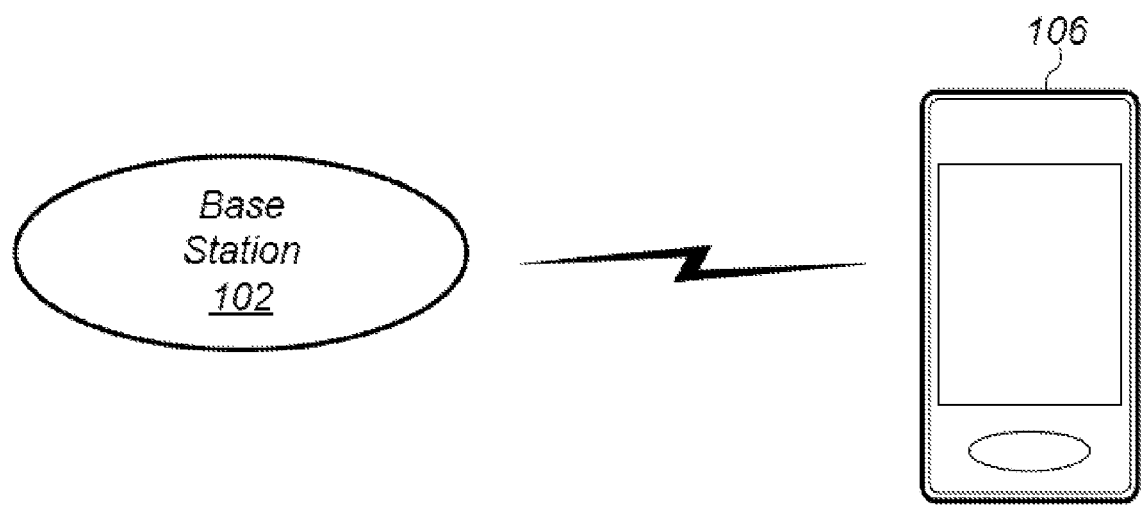
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
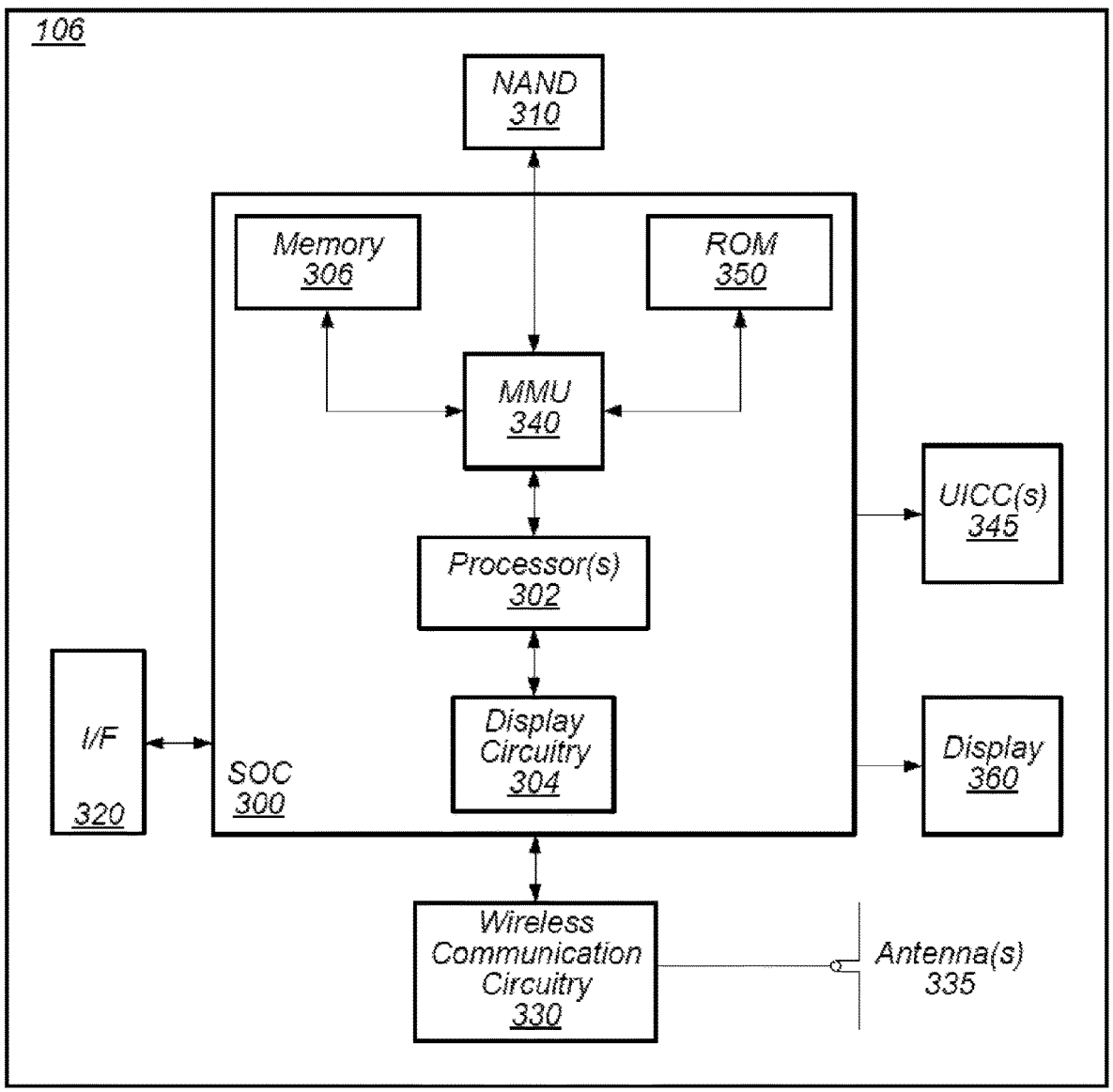
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
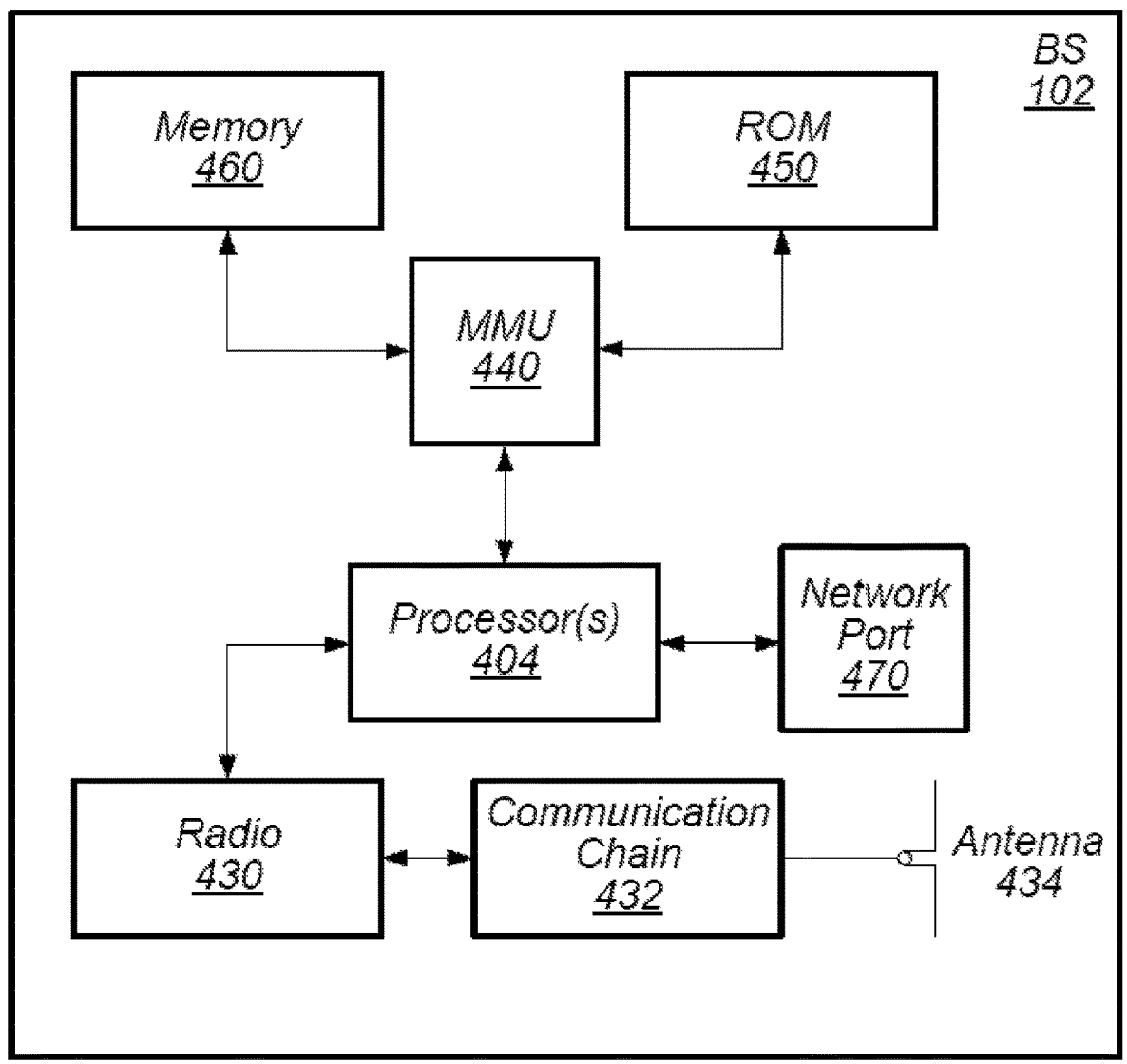
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
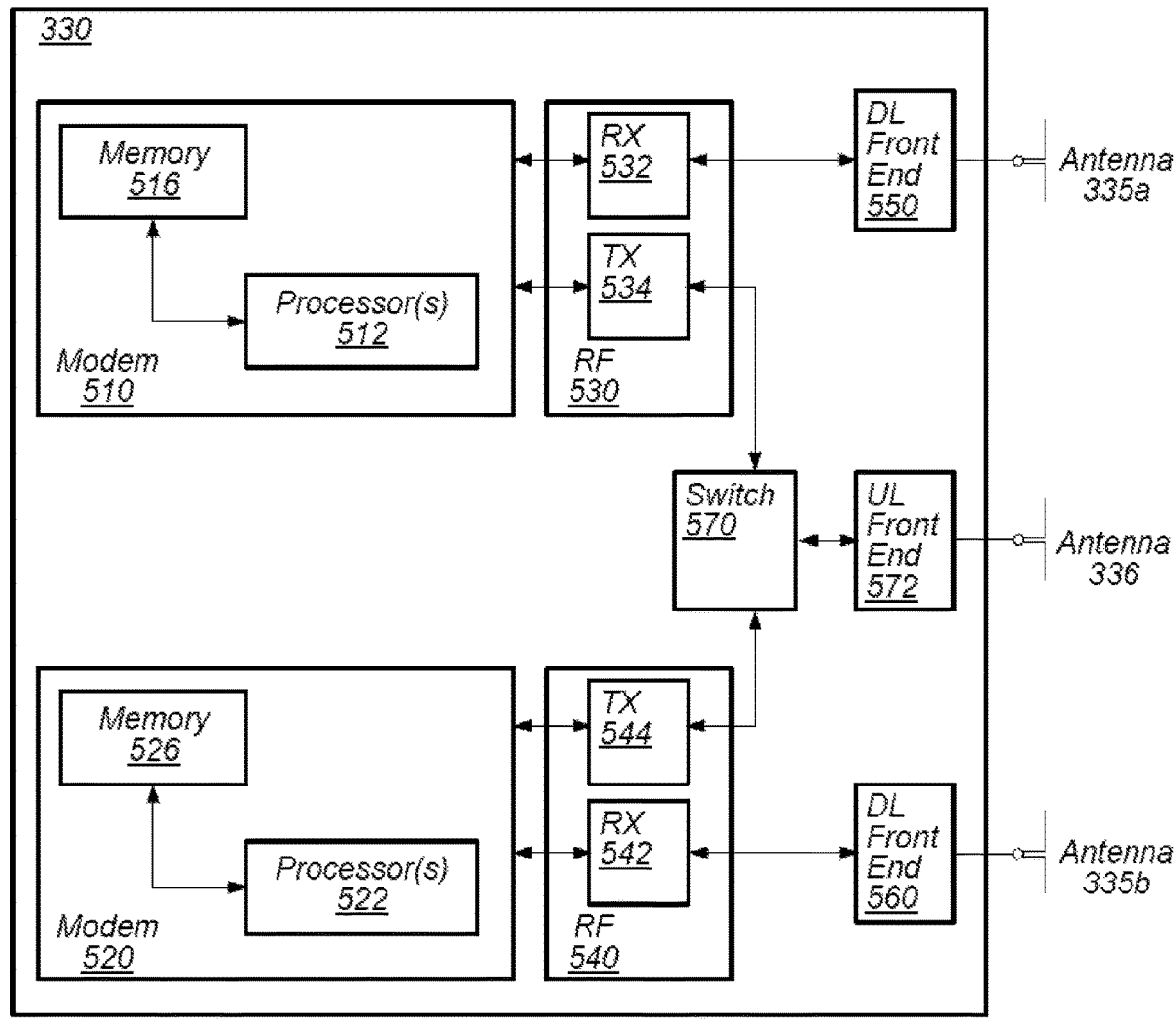
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

FIGS. 6-10 AP-SRS Triggering Offset Enhancement

New cellular communication techniques are continually under development, to increase coverage, to better serve the range of demands and use cases, and for a variety of other reasons. One technique that is currently under development may include the MIMO technique. In some MIMO schemes, a UE may be configured to transmit an AP-SRS to a base station. As part of such development, it would be useful to provide a framework that supports AP-SRS triggering offset enhancement.

Figure 6:
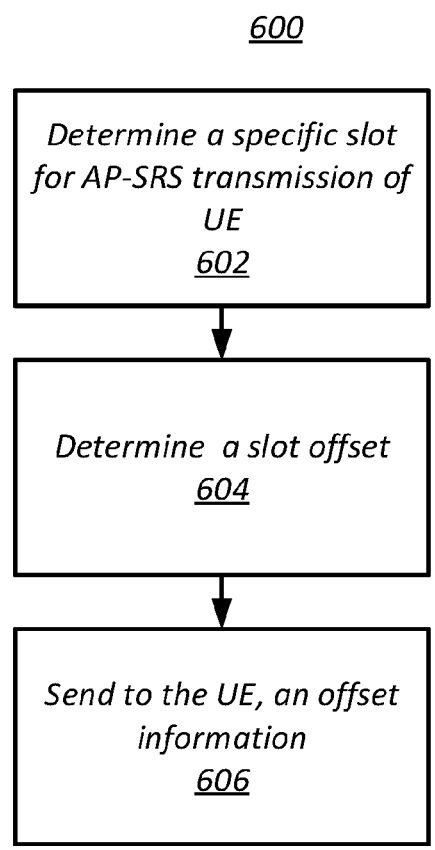
FIG. 6 is a flowchart diagram illustrating an example method for a base station to perform AP-SRS triggering offset enhancement, according to some embodiments.

Accordingly, FIG. 6 is a flowchart diagram illustrating an example method 600 for a base station to perform AP-SRS triggering offset enhancement, according to some embodiments. Aspects of the method of FIG. 6 may be implemented by a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 6 may operate as follows.

At 602, a base station may determine a specific slot for AP-SRS transmission of a UE. The specific slot may be any slot that is available for the UE to perform the AP-SRS transmission. According to various embodiments, available slots for the UE to perform the AP-SRS transmission may be determined based on various criteria.

Figures 8, 9:
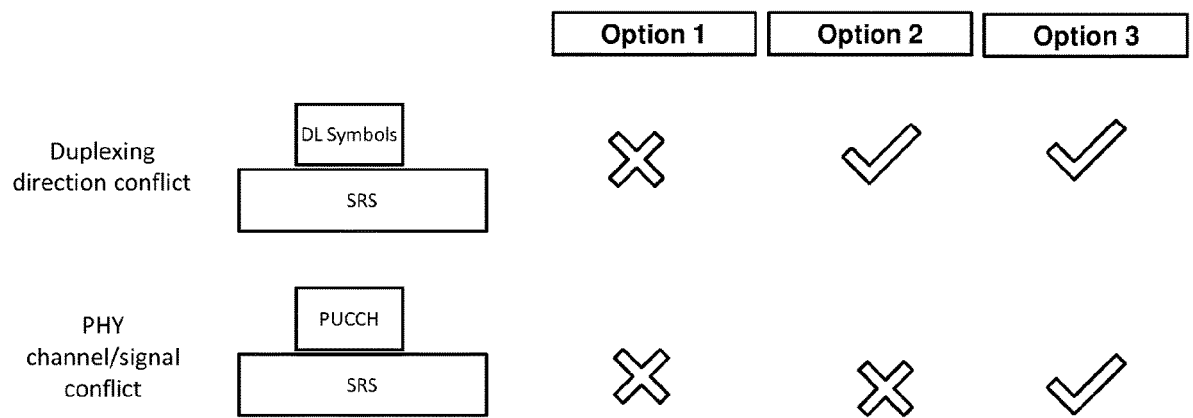
FIG. 8 illustrates example criteria applied in determining an available slot for AP-SRS transmission, according to some embodiments.
FIG. 9 illustrates example options for selection of methods that are considered for changing duplexing direction, according to some embodiments.

FIG. 8 illustrates example criteria applied in determining an available slot for AP-SRS transmission, according to some embodiments. Two example factors are illustrated, including duplexing direction conflict and PHY channel/signal conflict. Those skilled in the art would understand that any other factors may be considered without limitation.

Duplexing direction conflict may occur for a Time Division Duplex (TDD) device, which can perform only one of uplink (UL) transmission or downlink (DL) transmission in a single slot. Since SRS symbols (or, AP-SRS symbols) are UL symbols, SRS symbols may collide with coexisting DL symbols in a single slot for the TDD device.

PHY channel/signal conflict may occur when the PHY channel is occupied by other UL transmissions. For example, SRS symbols may collide with a PUCCH transmission, which may lead to PHY channel/signal conflict.

FIG. 8 illustrates three example options in determining an available slot for AP-SRS transmission. According to a first embodiment (Proposal 1.1 Option 1), any slot may be deemed as an available slot for AP-SRS transmission. In this embodiment, duplexing direction conflict or PHY channel/signal conflict may not be considered. According to a second embodiment (Proposal 1.1 Option 2), duplexing direction conflict may be considered while PHY channel/signal conflict may not be considered. That is, any slot without duplexing direction conflict may be deemed as an available slot for AP-SRS transmission, regardless of PHY channel/signal conflict. According to a third embodiment (Proposal 1.1 Option 3), both of duplexing direction conflict and PHY channel/signal conflict may be considered. In this case, any slot without duplexing direction conflict or PHY channel/signal conflict may be deemed as an available slot for AP-SRS transmission. If either of duplexing direction conflict or PHY channel/signal conflict occurs in a slot, that slot will not be deemed as an available slot for AP-SRS transmission. Other options are also possible. For example, in another option, PHY channel/signal conflict may be considered while duplexing direction conflict may be not.

In embodiments where duplexing direction conflict is considered, duplexing direction of slots may be changed via various methods (Proposal 1.2). The duplexing direction of slots may be changed from UL to DL, or vice versa. Hence, a change in duplexing direction may be further considered in determining an available slot for AP-SRS transmission. According to some embodiments, duplexing direction may be changed based on RRC or DCI in a semi-statically way or in a dynamically way. Example methods for changing the duplexing direction may include but not limited to:
  (a) Method 1: semi-statically changed by RRC/SIB (System Information Block), for example, via tdd-UL-DL-ConfigurationCommon;
  (b) Method 2: semi-statically changed by RRC, for example, via tdd-UL-DL-ConfigurationDedicated;
  (c) Method 3: Dynamically changed by dynamic SFI (Slot Format Indicator), i.e., DCI Format 2_0;
  (d) Method 4: Dynamically changed by dynamic DCI, i.e., DCI Format 1_0, 1_1, 1_2, 2_0, 2_1, 2_2.

Although the duplexing direction of a slot may be changed via any of the above methods, the base station may only consider one or more of the methods in determining an available slot for AP-SRS transmission. For example, it is preferable to consider a change in duplexing direction that is conducted only via RRC and/or SIB. In this case, a change due to SFI or DCI may not be considered.

FIG. 9 illustrates example options for selection of methods that are considered for changing duplexing direction, according to some embodiments. According to a first embodiment, Option 1 may be used, in which Methods 1 and 2 are considered while Methods 3 and 4 are not considered. According to a second embodiment, Option 2 may be used, in which Method 1 is considered while Methods 2, 3 and 4 are not considered. According to a third embodiment, Option 3 may be used, in which Methods 1, 2 and 3 are considered while Method 4 is not considered. According to a fourth embodiment, Option 4 may be used, in which Methods 1, 2, 3, and 4 are all considered. According to other embodiments, any other combinations of Methods 1, 2, 3, and 4 may also be considered. By considering a particular method, the base station may consider the arise or elimination of duplexing direction conflict due to a change in duplexing direction that is caused via that particular method. By not considering a particular method, the base station may not consider the arise or elimination of duplexing direction conflict due to a change in duplexing direction that is caused via that particular method.

According to some embodiments where the AP-SRS transmission may have one or more SRS symbols to be transmitted in a single slot, a conflict between the one or more SRS symbols with one or more symbols of a slot may be considered in determining the sequence of available slots.

For Multiple-Symbol SRS transmission in a single slot, the slot may be determined as invalid (i.e., not available) based on various criteria. According to some embodiments, the slot is determined as invalid (not an available slot) when a predetermined number/percentage of the SRS symbols in the SRS transmission are invalid. In a first embodiment (Proposal 1.4 Option 1), a slot is determined as not an available slot if each of the one or more SRS symbols has a conflict with a respective symbol in the slot. In a second embodiment (Proposal 1.4 Option 2), a slot is determined as not an available slot if at least one of the one or more SRS symbols has a conflict with a respective symbol in the slot. In another embodiment, other predetermined number/percentage may apply.

Further, for each SRS symbol, the SRS symbol may be determined as invalid (having a conflict) for duplexing direction conflict based on various criteria. In a first embodiment (Proposal 1.3 Option 1), an SRS symbol may be determined as having a conflict when the SRS symbol collides with a symbol configured as DL. In a second embodiment (Proposal 1.3 Option 2), an SRS symbol may be determined as having a conflict when the SRS symbol collides with a symbol configured as DL or Flexible. A symbol configured as Flexible means that the duplexing direction for that symbol has not been determined yet, which may be DL or UL.

Returning to FIG. 6, note that the base station does not necessarily determine the first upcoming available slot as the specific slot for AP-SRS transmission. Instead, the base station may determine any of the upcoming available slots as the specific slot of AP-SRS transmission. According to some embodiments, the base station may use a reference slot and a slot offset to indicate the determined specific slot for AP-SRS transmission.

At 604, the base station may determine a slot offset between the specific slot determined at 602 and a reference slot. The specific slot is associated with AP-SRS transmission. According to some embodiments, any suitable slot may be specified as the reference slot. According to other embodiments, the reference slot may be specified as a particular slot, for example, a slot in which one or more particular transmissions are performed. In a preferred embodiment, the reference slot may be the slot where a DCI that triggers the AP-SRS is transmitted.

According to some embodiments, determining the slot offset may comprise determining a number of available slots between the specific slot and the reference slot. As described above, various criteria may be applied in determining if a slot is an available slot for AP-SRS transmission. Hence, the determined number of available slots between the specific slot and the reference slot may depend on the specific criterion applied. In a first embodiment, each slot between the specific slot and the reference slot may be counted as an available slot. In a second embodiment, for each slot between the specific slot and the reference slot, the base station may determine whether the slot has duplexing direction conflict, and determine the slot as an available slot based on a determination that the slot does not have duplexing direction conflict. In a third embodiment, for each slot between the specific slot and the reference slot, the base station may determine whether the slot whether the slot has duplexing direction conflict or PHY channel/signal conflict, and determine the slot as an available slot based on a determination that the slot does not have either duplexing direction conflict or PHY channel/signal conflict.

According to some embodiments, determining the number of available slots may be based on a change in duplexing direction for one or more slots between the specific slot and the reference slot, as discussed in (Proposal 1.2) above.

According to some embodiments, determining the number of available slots may be based on a conflict between one or more SRS symbols with one or more symbols of a slot between the specific slot and the reference slot, as discussed in (Proposal 1.3) and (Proposal 1.4) above.

At 606, the base station may send to the UE, an offset information that is associated with the determined slot offset. According to some embodiments, the offset information may be sent in various format. According to some embodiments, the offset information may indicate the determined slot offset in various ways.

According to some embodiments, the offset information sent by the base station may include one or more types of offset information in different types of signaling. For example, the base station may send an RRC signaling to the UE. The RRC signaling may comprise a first offset information that is associated with the AP-SRS transmission. The first offset information may be deemed as "RRC configured slot offset". In this way, a slot offset may be RRC configured in each SRS-ResourceSet. An example of slot offset configured by RRC may be illustrated below (see parameter slotOffset):

```
SRS-ResourceSet ::=                              SEQUENCE {
    srs-ResourceSetId                                SRS-ResourceSetId,
    srs-ResourceIdList                               SEQUENCE (SIZE(1..maxNrofSRS-
ResourcesPerSet)) OF SRS-ResourceId               OPTIONAL, -- Cond Setup
    resourceType                                     CHOICE {
        aperiodic                                        SEQUENCE {
            aperiodicSRS-ResourceTrigger                     INTEGER (1..maxNrofSRS-TriggerStates-
1),
            csi-RS                                           NZP-CSI-RS-ResourceId
OPTIONAL, -- Cond NonCodebook
            slotOffset                                       INTEGER (1..32)
OPTIONAL, -- Need S
            ...,
            [[
            aperiodicSRS-ResourceTriggerList                 SEQUENCE (SIZE(1..maxNrofSRS-
TriggerStates-2))
```

-continued

```
                                     OF INTEER (1..maxNrofSRS-
TriggerStates-1)    OPTIONAL -- Need M
       ]]
   },
   semi-persistent                   SEQUENCE {
       associatedCSI-RS              NZP-CSI-RS-ResourceId
OPTIONAL, -- Cond NonCodebook
       ...
   },
   periodic                          SEQUENCE {
       associatedCSI-RS              NZP-CSI-RS-ResourceId
       ...
   }
   },
   ussage                            ENUMERATED {beamManagement, codebook,
noncodebook, antennaSwitching},
   alpha                             Alpha
OPTIONAL, -- Need S
   p0                                INTEGER (-202..24)
OPTIONAL, -- Cond Setup
   pathlossReferenceRS               PathlossReferenceRS-Config
OPTIONAL, -- Need M
   srs-PowerControlAdjustmentStates  ENUMERATED { sameAsFci2, separateClosedLoop}
OPTIONAL, -- Need S
   ...,
   [[
   pathlossReferenceRSList-r16       SetupRelease { PathlossReferenceRSList-r16}
OPTIONAL -- Need M
```

According to some embodiments, in addition to the RRC configured slot offset or as a replacement thereof, the base station may send a DCI that comprises a second offset information associated with the AP-SRS transmission. The second offset information may be deemed as "DCI indicated slot offset". The DCI provides for dynamic indication of the slot offset. The second offset information, alone or in combination with the first offset information configured in the RRC, may dynamically indicate the slot offset associated with the AP-SRS transmission.

According to some embodiments, the slot offset as determined at 604 may be indicated via the DCI regardless of the first offset information in the RRC signaling. In a first embodiment (Proposal 2.2 Option 1), the DCI indicated slot offset may override the RRC configured slot offset. For example, the second offset may indicate the slot offset as determined at 604, or more specifically, the determined number of available slots between the specific slot for AP-SRS transmission and the reference slot. As a result, the DCI indicated slot offset may be calculated as:

$$\text{DCI indicated slot offset} = \text{the slot offset} \quad (\text{Eq. 1})$$

According to some embodiments, the slot offset may be indicated via a combination of the DCI and the RRC signaling. In these embodiments, for dynamic indication of slot offset, the second offset information indicated in DCI may coexist and combine with the RRC configured slot offset in various ways.

In a second embodiment (Proposal 2.2 Option 2), the DCI indicated slot offset may be added on top of the RRC configured slot offset. For example, the second offset information may comprise a second offset. The second offset may indicate a difference between a first offset as configured by the first offset information in the RRC signaling and the determined number of available slots. As a result, the DCI indicated slot offset may be calculated as:

$$\text{DCI indicated slot offset} = \text{the slot offset} - \text{RRC configured slot offset} \quad (\text{Eq.2})$$

In a third embodiment (Proposal 2.2 Option 3), when DCI can indicate a slot offset, RRC may configure a list of slot offsets per AP SRS Resource Set, and the DCI may indicate an index, i.e. one value, in the RRC configured list of multiple slot offsets. For example, the first offset information in the RRC signaling may comprise a list of offsets while the second offset information in the DCI may comprise an index for offset. The offset in the list that corresponds to the index for offset may indicate the slot offset as determined at 604, or more specifically, the determined number of available slots between the specific slot as determined at 602 and the reference slot. As a result, the index for offset in the DCI may be selected such that:

$$\text{RRC configured slot offset list [DCI indicated index]} = \text{the slot offset} \quad (\text{Eq.3})$$

According to some embodiments described above, a slot offset may be indicated in the DCI on top of the RRC configured slot offset. In these embodiments, the DCI indicated slot offset (i.e., second offset) and the RRC configured slot offset (i.e., the first offset) may be counted or determined based on different criteria.

Figure 10:
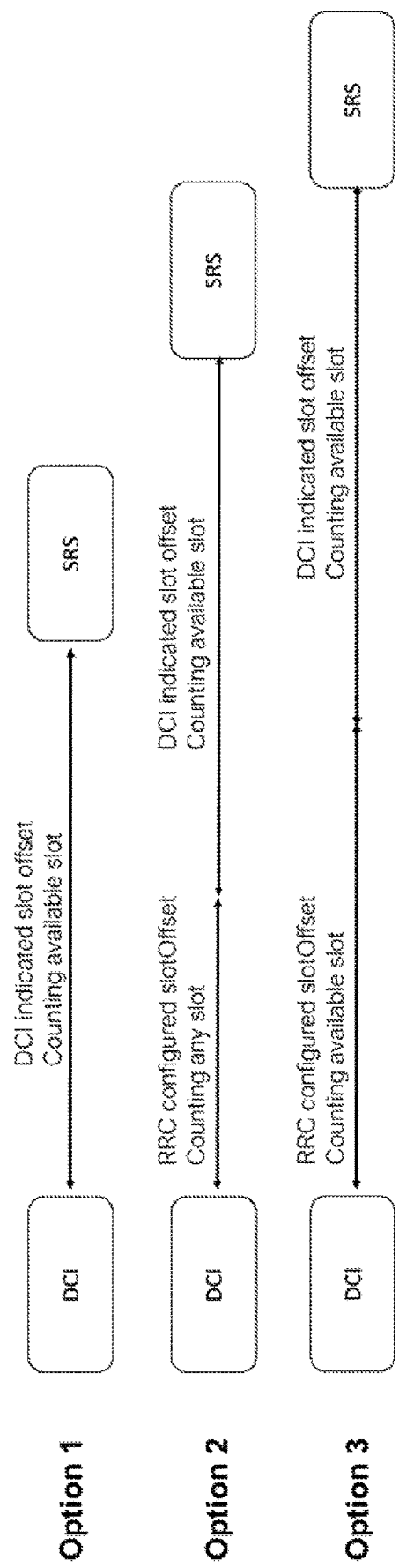
FIG. 10 illustrates example options for determining relationship among a slot offset, a DCI indicated slot offset and an RRC configured slot offset, according to some embodiment.

FIG. 10 illustrates example options for determining relationship among a slot offset, a DCI indicated slot offset and an RRC configured slot offset, according to some embodiment. In a first embodiment (Proposal 3.1, Option 1), the DCI indicated slot offset overrides the RRC configured slot offset. As a result, the slot offset between the reference slot (where DCI that triggers the AP-SRS transmission was transmitted) and the determined specific slot (where the SRS symbols are to be transmitted) may be the DCI indicated slot offset, which only counts available slots based on the criteria described above. In a second embodiment (Proposal 3.1, Option 2), the DCI indicated slot offset is counted as available slots for AP-SRS transmission using criteria described above, while the RRC configured slot offset is counted as legacy slots (i.e., any slot without determining whether the slot is available or not available for AP-SRS transmission). As a result, the slot offset between the reference slot and the determined specific slot may be a sum of the RRC configured slot offset that counts any slot and the DCI indicated slot offset that counts only available slots. In a third embodiment (Proposal 3.1, Option 3), both of the DCI indicated slot offset and the RRC configured slot offset may be counted as available slots for AP-SRS transmission. As a result, the slot offset between the reference slot and the determined specific slot may be a sum of the RRC configured slot offset that counts only available slots and the DCI indicated slot offset that counts only available slots.

According to some embodiments, the base station may send multiple DCIs to the UE, each comprising a respective second offset information. In one embodiment, the slot offset may be indicated by the latest DCI alone. In this case, like the first embodiment (Proposal 2.2 Option 1 and Proposal 3.1 Option 1) above, the second offset in a latter DCI overrides the second offset in a previous DCI. In the case where the index for offset is used, the index for offset in a latter DCI overrides the index for offset in a previous DCI. In another embodiment, the effective slot offset may be a sum of respective second offsets in the multiple DCIs (and a first offset in the RRC signaling).

According to some embodiments, the DCI comprising the second offset information may be an UL DCI (such as DCI Format 0_1, 0_2), an DL DCI (such as DCI Format 1_1, 1_2) or a special DCI (such as DCI Format 2_3).

According to some embodiments, for dynamic indication of the slot offset, DCI field enhancement may be introduced. Specifically, the base station may comprise the second offset information in the DCI by adding a new field to the DCI or by increasing bit width of an existing field of the DCI.

In a first embodiment (Proposal 2.1, Option 1), a new DCI field "SRS slot offset" may be introduced. In a second embodiment (Proposal 2.1, Option 2), the bitwidth of the existing "SRS request" field may be increased, with the M LSB/MSB bits being used to indicate the AP SRS Resource Set ID and the remaining bits being used to indicate the slot offset (more specifically, the second offset information). In a third embodiment where the special DCI (such as DCI Format 2_3) may be used, each block of the DCI Format 2_3 may be enhanced for AP-SRS triggering offset. In a first example (Proposal 2.3 Option 1), a new field for each block can be added for "SRS slot offset". In a second example (Proposal 2.3 Option 2), the bitwidth of the existing block may be increased, with the M LSB/MSB bits being used to indicate the AP SRS Resource Set ID and the remaining bits being used to indicate the slot offset (more specifically, the second offset information).

According to some embodiments ((Proposal 2.4), we may increase the bitwidth of "SRS request" field. Currently, the maximum bitwidth of the "SRS request" field is 2 bits, and thus only a maximum of three (3) AP-SRS resource sets is allowed to be configured. By increase of the bitwidth, the base station (e.g., gNB) may be allowed to configure more than 3 AP-SRS resource sets. As a result, the base station may configure multiple AP-SRS resource set with the same configuration except for slot offset. In this case, the base station may trigger different AP-SRS resource set in order to indicate different slot offsets.

Returning to FIG. 6, note that the base station may perform one or more additional steps. For example, the base station may receive from UE an AP-SRS transmission in the specific slot as determined at 602. Further, the base station may perform any MIMO operations based on the received AP-SRS transmission.

Figure 7:
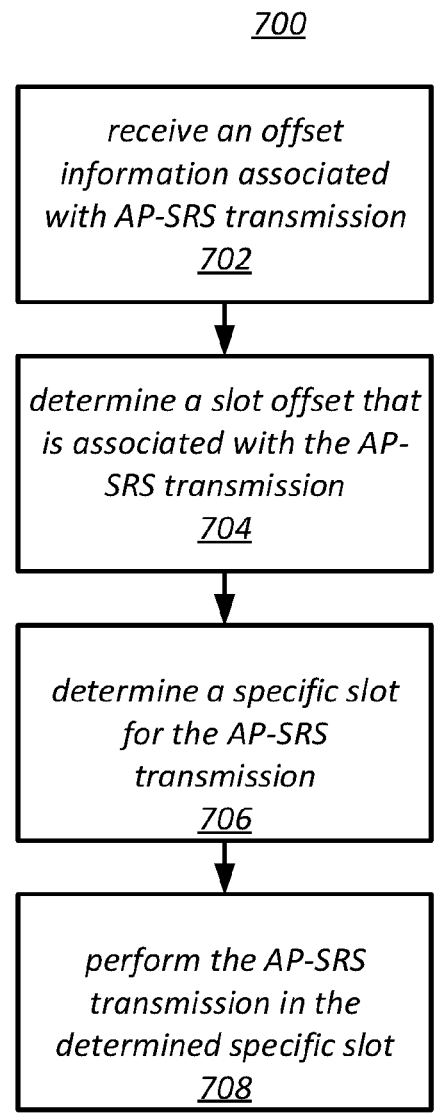
FIG. 7 is a flowchart diagram illustrating an example method for a UE to perform an AP-SRS transmission based on AP-SRS triggering offset enhancement, according to some embodiments.

FIG. 7 is a flowchart diagram illustrating an example method 700 for a UE to perform an AP-SRS transmission based on AP-SRS triggering offset enhancement, according to some embodiments.

Aspects of the method of FIG. 7 may be implemented by a user equipment such as a UE 106 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method of FIG. 7 may operate as follows.

At 702, a UE may receive an offset information associated with AP-SRS transmission of the UE. According to some embodiments, the offset information may be received from a base station in various formats. According to some embodiments, the offset information may indicate a slot offset associated with the AP-SRS transmission in various ways.

According to some embodiments, the received offset information may include one or more types of offset information in different types of signaling. For example, the UE may receive an RRC signaling from the base station, the RRC signaling comprising a first offset information that is associated with the AP-SRS transmission.

According to some embodiments, in addition to the RRC configured slot offset or as a replacement thereof, the UE may receive a DCI from the base station. The DCI may comprise a second offset information that is associated with the AP-SRS transmission.

At 704, the UE may determine, at least based on the offset information, a slot offset associated with the AP-SRS transmission. The determined slot offset may indicate an offset between a reference slot and a specific slot in which the AP-SRS transmission is to be performed. According to various embodiment, the determination may be made based on the second offset information alone or in combination with the first offset information as configured in the RRC signaling.

In some embodiments, the UE may determine the slot offset associated with the AP-SRS transmission based on a second offset that is indicated in the second offset information in the DCI, regardless of a first offset in the first offset information in the RRC signaling. In this case, the UE may override the received RRC configured slot offset (i.e., the first offset) with the DCI indicated slot offset (i.e., the second offset). That is, the UE determines the slot offset as the second offset that is indicated in the second offset information, as described by (Eq.4) below:

$$\text{the effective slot offset} = \text{DCI indicated slot offset} \qquad \text{(Eq.4)}$$

In alternative embodiments, the UE may determine the slot offset via a combination of the DCI and the RRC signaling. In different embodiment, the combination may have different implementations.

In a second embodiment, the DCI indicated slot offset may be added on top of the RRC configured slot offset. Specifically, the UE may determine the slot offset as a sum of a first offset that is configured in the first offset information and a second offset that is indicated in the second offset information, as described by (Eq.5) below:

$$\text{the effective slot offset} = \text{DCI indicated slot offset} + \text{RRC configured slot offset} \qquad \text{(Eq.5)}$$

In a third embodiment, the first offset information may comprise a list of offsets, and the second offset information may comprise an index for offset. In this case, the UE may determine the slot offset as an offset in the list that corresponds to the index for offset, as described by (Eq.6) below:

the effective slot offset=RRC configured slot offset list [DCI indicated index]  (Eq.6)

At 706, the UE may determine, based on the determined slot offset, a specific slot for the AP-SRS transmission. The specific slot may be a slot that is offset from a reference slot by the slot offset as determined at 704. The reference slot may be specified by any predetermined rule agreed by the UE and the base station. According to some embodiments, any suitable slot may be specified as the reference slot. According to other embodiments, the reference slot may be specified as a particular slot, for example, a slot in which one or more particular transmissions are performed. In a preferred embodiment, the reference slot may be the slot where the DCI triggers the AP-SRS transmission is performed.

According to some embodiment, in order to determine a specific slot for the AP-SRS transmission, the UE may determine a sequence of available slots counting from the reference slot. Further, the UE may determine the specific slot as the (t+1)-th available slot in the sequence of available slots, where t represents the determined slot offset and the reference slot is counted as slot [0] in the sequence of available slots.

As describe above, various criteria may be applied in determining an available slot. The criteria applied by the UE may be consistent with those applied by the base station. As a result, the UE may determine the sequence of available slots in various manners.

In a first embodiment where any slot may be deemed as an available slot, the UE may determine each slot counting from the reference slot as an available slot, thereby obtaining the sequence of available slots. In a second embodiment where duplexing direction conflict is considered, for each slot counting from the reference slot, the UE may determine whether the slot has duplexing direction conflict and determine the slot as an available slot based on a determination that the slot does not have duplexing direction conflict. The resultant sequence of available slots therefore excludes any slot with duplexing direction conflict. In a third embodiment where both of duplexing direction conflict and PHY channel/signal conflict are considered, for each slot counting from the reference slot, the UE may determine whether a slot has duplexing direction conflict or PHY channel/signal conflict and determine the slot as an available slot based on a determination that the slot does not have either duplexing direction conflict or PHY channel/signal conflict. The resultant sequence of available slots therefore excludes any slot with duplexing direction conflict or PHY channel/signal conflict. Other options are also possible. For example, in another option, PHY channel/signal conflict may be considered while duplexing direction conflict may be not.

In embodiments where duplexing direction conflict is considered, duplexing direction of slots may be changed via various methods. Hence, a change in duplexing direction may be considered in determining an available slot for AP-SRS transmission. For methods that are capable of changing the duplexing direction of a slot, the UE may consider one or more of the methods in determining an available slot for AP-SRS transmission. For example, it is preferable to consider a change in duplexing direction that is conducted only via RRC and/or SIB. In this case, a change due to SFI or DCI may not be considered. The example options regarding the selection of methods considered by the UE have been discussed with respect to in FIG. 9. According to a first embodiment, Option 1 may be used, in which Methods 1 and 2 are considered while Methods 3 and 4 are not considered. According to a second embodiment, Option 2 may be used, in which Method 1 is considered while Methods 2, 3 and 4 are not considered. According to a third embodiment, Option 3 may be used, in which Methods 1, 2 and 3 are considered while Method 4 is not considered. According to a fourth embodiment, Option 4 may be used, in which Methods 1, 2, 3, and 4 are all considered. By considering a particular method, the UE may take into account a change in duplexing direction that is caused by that particular method. By not considering a particular method, the UE may ignore a change in duplexing direction that is caused by that particular method. In other words, when determining if a duplexing direction conflict occurs for a slot, the UE takes into account the original duplexing direction for the slot, rather than the changed duplexing direction.

According to some embodiments, the AP-SRS transmission may have one or more SRS symbols to be transmitted in a single slot. In these embodiments, a slot may be determined as invalid (i.e., not available) based on various criteria. According to some embodiments, the UE may determine a slot as invalid if a predetermined number/percentage of the SRS symbols in the SRS transmission in the slot are invalid. In a first embodiment, the UE may determine a slot as not an available slot if each of the one or more SRS symbols has a conflict with a respective symbol in the slot. In a second embodiment, the UE may determine a slot as not an available slot if at least one of the one or more SRS symbols has a conflict with a respective symbol in the slot. In another embodiment, other predetermined number/percentage may apply.

Further, for each SRS symbol, the UE may determine the SRS symbol as having a conflict for duplexing direction conflict based on various criteria. In a first embodiment, the UE may determine an SRS symbol having a conflict when the SRS symbol collides with a symbol configured as DL. In a second embodiment, the UE may determine an SRS symbol as having a conflict when the SRS symbol collides with a symbol configured as DL or Flexible.

According to some embodiments described above, the slot offset may be indicated in the DCI on top of the RRC configured slot offset. In these embodiments, the DCI indicated slot offset (i.e., the second offset) and the RRC configured slot offset (i.e., the first offset) may be counted or determined based on different criteria. Accordingly, in determining the sequence of available slots, the UE may need to treat the RRC configured slot offset and the DCI indicated slot offset differently. Different example options for the relationship among the slot offset, the DCI indicated slot offset and the RRC configured slot offset have been discussed above with respect to FIG. 10. In Option 1 where the DCI indicated slot offset overrides the RRC configured slot offset, the UE may count t2 available slots from the reference slot thereby obtaining the specific slot for AP-SRS transmission, t2 representing the DCI indicated slot offset. In Option 2 where the DCI indicated slot offset is counted as available slots while the RRC configured slot offset is counted as legacy slots, the UE may firstly determine t1 (representing the RRC configured slot offset) legacy slots from the reference slot and then determine t2 (representing the DCI indicated slot offset) subsequent available slots, thereby obtaining the specific slot for AP-SRS transmission. In Option 3 where both of the DCI indicated slot offset and the RRC configured slot offset may be counted as available slots, the UE may determine an sequence of t1 (representing the RRC configured slot offset)+t2 (representing the DCI indicated slot offset) available slots from the reference slot, thereby obtaining the specific slot for AP-SRS transmission.

According to some embodiments, the UE may receive multiple DCIs from the base station, each comprising a respective second offset information. In one embodiment, the UE may determine the slot offset based on the latest DCI alone. In this case, the second offset in a latter DCI may override the second offset in a previous DCI. In the case where an index for offset is used, the index for offset in a latter DCI may override the index for offset in a previous DCI. In another embodiment, the slot offset may be a sum of respective second offsets in the multiple DCIs (and a first offset in the RRC signaling).

According to some embodiments, the Subcarrier Spacing (SCS) of the AR-SRS may be different form the SCS of the DCI that triggers the AR-SRS transmission. In this case, a width of the reference slot may be determined in various ways. In a first embodiment (Proposal 3.2, Option 1), the reference slot may be determined based on the SCS of the AP-SRS. In a second embodiment (Proposal 3.2, Option 2), the reference slot may be determined based on the SCS of the DCI that triggers AP-SRS. In a third embodiment (Proposal 3.2, Option 3), the reference slot may be determined based on the larger SCS of the SCS of the AP-SRS and the SCS of the DCI that triggers AP-SRS. In a fourth embodiment (Proposal 3.2, Option 4), the reference slot may be determined based on the smaller SCS of the SCS of the AP-SRS and the SCS of the DCI that triggers AP-SRS. In addition, the width of the available slots may be specified in a same manner.

According to some embodiments, the received DCI comprising the second offset information may be an UL DCI (such as DCI Format 0_1, 0_2), an DL DCI (such as DCI Format 1_1, 1_2) or a special DCI (such as DCI Format 2_3). Furthermore, the second offset information is comprised in the DCI by adding a new field to the DCI or by increasing bit width of an existing field of the DCI, which may be implemented by various example methods as discussed above.

Returning to FIG. 7, the UE may perform the AP-SRS transmission in the determined specific slot at 708. The AP-SRS transmission may include one or more SRS symbols.

Various implementations of AP-SRS triggering offset enhancement for further enhanced MIMO have been disclosed, which provide a framework that supports dynamic and flexible triggering of AP-SRS transmission.

In the following further exemplary embodiments are provided.

One set of embodiments may include a user equipment (UE), comprising: at least one antenna; at least one radio coupled to the at least one antenna; and a processor coupled to the at least one radio; wherein the UE is configured to: receive an offset information associated with AP-SRS transmission of the UE; determine a slot offset associated with the AP-SRS transmission, at least based on the offset information; determine a specific slot for the AP-SRS transmission, based on the determined slot offset; and perform the AP-SRS transmission in the determined specific slot.

According to some embodiments, receiving the offset information comprises: receiving a RRC signaling, the RRC signaling comprising a first offset information that is associated with the AP-SRS transmission; and/or receiving a DCI, the DCI comprising a second offset information that is associated with the AP-SRS transmission.

According to some embodiments, determining the slot offset comprises determining the slot offset as a second offset that is indicated in the second offset information.

According to some embodiments, determining the slot offset comprises determining the slot offset as a sum of a first offset that is configured in the first offset information and a second offset that is indicated in the second offset information.

According to some embodiments, the first offset information comprises a list of offsets, the second offset information comprises an index for offset, and determining the slot offset comprises determining the slot offset as an offset in the list that corresponds to the index for offset.

According to some embodiments, determining the specific slot based on the determined slot offset comprises: determining a sequence of available slots counting from a reference slot; and determining the specific slot as the (t+1)-th available slot in the sequence of available slots, where t represents the determined slot offset and t≥0.

According to some embodiments, determining the sequence of available slots comprises determining each slot as an available slot.

According to some embodiments, determining the sequence of available slots comprises: determining whether a slot has duplexing direction conflict; and based on a determination that the slot does not have duplexing direction conflict, determining the slot as an available slot.

According to some embodiments, determining the sequence of available slots comprises: determining whether a slot has duplexing direction conflict or PHY channel/signal conflict; and based on a determination that the slot does not have either duplexing direction conflict or PHY channel/signal conflict, determining the slot as an available slot.

According to some embodiments, determining the sequence of available slots is at least based on a change in duplexing direction for one or more slots.

According to some embodiments, the change in duplexing direction is conducted via RRC and/or SIB.

According to some embodiments, the AP-SRS transmission has one or more SRS symbols to be transmitted in a slot, and determining the sequence of available slots is at least based on a conflict between the one or more SRS symbols with one or more symbols of a slot.

According to some embodiments, determining the sequence of available slots comprises: determining a slot as not an available slot if each of the one or more SRS symbols has a conflict with a respective symbol in the slot; or determining a slot as not an available slot if at least one of the one or more SRS symbols has a conflict with a respective symbol in the slot.

According to some embodiments, the conflict of an SRS symbol comprises at least one of: the SRS symbol colliding with a DL symbol; or the SRS symbol colliding with a Flexible symbol.

According to some embodiments, a width of the reference slot is based on at least one of: SCS of the DCI; or SCS of the AP-SRS.

According to some embodiments, the DCI comprising the second offset information is at least one of: an uplink (UL) DCI Format 0_1, 0_2; a downlink (DL) DCI Format 1_1, 1_2; or a special DCI Format 2_3; and the second offset information is comprised in the DCI by adding a new field to the DCI or by increasing bit width of an existing field of the DCI.

One set of embodiments may include an apparatus for operating a user equipment (UE), the apparatus comprising: a processor configured to cause the UE to: receive an offset information associated with AP-SRS transmission of the UE; determine a slot offset associated with the AP-SRS transmission, at least based on the offset information; determine a specific slot for the AP-SRS transmission, based on the determined slot offset; and perform the AP-SRS transmission in the determined specific slot.

According to some embodiments, the processor of the apparatus may be configured to cause the UE to perform any other operations of the UE disclosed herein.

One set of embodiments may include a method for operating a user equipment (UE), the method comprising: receiving an offset information associated with AP-SRS transmission of the UE; determining a slot offset associated with the AP-SRS transmission, at least based on the offset information; determining a specific slot for the AP-SRS transmission, based on the determined slot offset; and performing the AP-SRS transmission in the determined specific slot.

According to some embodiments, the method may further include any other operations of the UE disclosed herein.

One set of embodiments may include a non-transitory computer-readable memory medium storing program instructions, wherein the program instructions, when executed by a processor of user equipment (UE), cause the UE to: receive an offset information associated with AP-SRS transmission of the UE; determine a slot offset associated with the AP-SRS transmission, at least based on the offset information; determine a specific slot for the AP-SRS transmission, based on the determined slot offset; and perform the AP-SRS transmission in the determined specific slot.

According to some embodiments, the program instructions stored in the non-transitory computer-readable memory medium, when executed by the processor, may cause the UE to any other operations of the UE disclosed herein.

One set of embodiments may include a computer program product comprising program instructions, wherein the program instructions, when executed by a processor of a user equipment (UE), cause the UE to: receive an offset information associated with AP-SRS transmission of the UE; determine a slot offset associated with the AP-SRS transmission, at least based on the offset information; determine a specific slot for the AP-SRS transmission, based on the determined slot offset; and perform the AP-SRS transmission in the determined specific slot.

According to some embodiments, the program instructions comprised in the computer program product, when executed by the processor, may cause the UE to any other operations of the UE disclosed herein.

One set of embodiments may include a base station, comprising: at least one antenna; at least one radio coupled to the at least one antenna; and a processor coupled to the at least one radio; wherein the base station is configured to: determine a specific slot for AP-SRS transmission of a user equipment (UE); determine a slot offset between the specific slot and a reference slot; and send to the UE, an offset information that is associated with the determined slot offset.

According to some embodiments, determining the slot offset comprises determining a number of available slots between the specific slot and the reference slot.

According to some embodiments, sending the offset information comprises: sending a RRC signaling, the RRC signaling comprising a first offset information that is associated with the AP-SRS transmission; and/or sending a DCI, the DCI comprising a second offset information that is associated with the AP-SRS transmission.

According to some embodiments, the second offset information comprises a second offset, the second offset indicating the determined number of available slots.

According to some embodiments, the second offset information comprises a second offset, the second offset indicating a difference between a first offset as configured by the first offset information and the determined number of available slots.

According to some embodiments, the first offset information comprises a list of offsets and the second offset information comprises an index for offset, with an offset in the list that corresponds to the index for offset indicating the determined number of available slots.

According to some embodiments, determining the number of available slots comprises determining each slot between the specific slot and the reference slot as an available slot.

According to some embodiments, determining the number of available slots comprises: for each slot between the specific slot and the reference slot: determining whether the slot has duplexing direction conflict; and based on a determination that the slot does not have duplexing direction conflict, determining the slot as an available slot.

According to some embodiments, determining the number of available slots comprises: for each slot between the specific slot and the reference slot: determining whether the slot has duplexing direction conflict or PHY channel/signal conflict; based on a determination that the slot does not have either duplexing direction conflict or PHY channel/signal conflict, determining the slot as an available slot.

According to some embodiments, determining the number of available slots is further based on a change in duplexing direction for one or more slots between the specific slot and the reference slot.

According to some embodiments, the change in duplexing direction is conducted via RRC and/or SIB.

According to some embodiments, the AP-SRS transmission has one or more SRS symbols to be transmitted in a slot, and determining the number of available slots is further based on a conflict between the one or more SRS symbols with one or more symbols of a slot between the specific slot and the reference slot.

According to some embodiments, determining the sequence of available slots comprises: determining the slot as not an available slot if each of the one or more SRS symbols has a conflict with a respective symbol in the slot; or determining the slot as not an available slot if at least one of the one or more SRS symbols has a conflict with a respective symbol in the slot.

According to some embodiments, the conflict of an SRS symbol comprises at least one of: the SRS symbol colliding with a DL symbol; or the SRS symbol colliding with a Flexible symbol.

According to some embodiments, wherein a width of the reference slot is determined based on at least one of: SCS of the DCI; or SCS of the AP-SRS.

According to some embodiments, the DCI comprising the second offset information is at least one of: an uplink (UL) DCI Format 0_1, 0_2; a downlink (DL) DCI Format 1_1, 1_2; or a special DCI Format 2_3; wherein the second offset information is comprised in the DCI by adding a new field to the DCI or by increasing bit width of an existing field of the DCI.

One set of embodiments may include an apparatus for operating a base station, the apparatus comprising: a processor configured to cause the base station to: determine a specific slot for AP-SRS transmission of a user equipment (UE); determine a slot offset between the specific slot and a reference slot, the slot offset indicating a number of available slots between the specific slot and the reference slot; and send to the UE, a second offset information that is associated with the determined slot offset.

According to some embodiments, the processor of the apparatus may be configured to cause the base station to perform any other operations of the base station disclosed herein.

One set of embodiments may include a method for operating a base station, the method comprising: determining a specific slot for AP-SRS transmission of a user equipment (UE); calculating a slot offset between the specific slot and a reference slot, the slot offset indicating a number of available slots between the specific slot and the reference slot; and sending to the UE, a second offset information that is associated with the determined slot offset.

According to some embodiments, the method may further include any other operations of the base station disclosed herein.

One set of embodiments may include a non-transitory computer-readable memory medium storing program instructions, wherein the program instructions, when executed by a base station, cause the base station to: determine a specific slot for AP-SRS transmission of a user equipment (UE); determine a slot offset between the specific slot and a reference slot, the slot offset indicating a number of available slots between the specific slot and the reference slot; and send to the UE, a second offset information that is associated with the determined slot offset.

According to some embodiments, the program instructions stored in the non-transitory computer-readable memory medium, when executed by the processor, may cause the base station to any other operations of the base station disclosed herein.

One set of embodiments may include a computer program product comprising program instructions, wherein the program instructions, when executed by a base station, cause the base station to: determine a specific slot for AP-SRS transmission of a user equipment (UE); determine a slot offset between the specific slot and a reference slot, the slot offset indicating a number of available slots between the specific slot and the reference slot; and send to the UE, a second offset information that is associated with the determined slot offset.

According to some embodiments, the program instructions comprised in the computer program product, when executed by the processor, may cause the base station to any other operations of the base station disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE), comprising:
at least one antenna;
at least one radio coupled to the at least one antenna; and
a processor coupled to the at least one radio;
wherein the UE is configured to:
   receive an offset information associated with an Aperiodic Sounding Reference Signal (AP-SRS) transmission of the UE;
   determine a slot offset associated with the AP-SRS transmission, at least based on the offset information;
   determine a specific slot for the AP-SRS transmission, based on the determined slot offset by:
      determining a sequence of available slots counting from a reference slot; and
      determining the specific slot as a (t+1)-th available slot in the sequence of available slots, t representing the slot offset; and
   perform the AP-SRS transmission in the specific slot, wherein a width of the reference slot is based on at least one of a Subcarrier Spacing (SCS) of a Downlink Control Information (DCI) or a SCS of the AP-SRS.

2. The UE of claim 1, wherein receiving the offset information comprises:
receiving a Radio Resource Control (RRC) signaling, the RRC signaling comprising a first offset information that is associated with the AP-SRS transmission; and
receiving a Downlink Control Information (DCI), the DCI comprising a second offset information that is associated with the AP-SRS transmission.

3. The UE of claim 2, wherein determining the slot offset comprises:
determining the slot offset as a second offset that is indicated in the second offset information.

4. The UE of claim 2, wherein determining the slot offset comprises:
determining the slot offset as a sum of a first offset that is configured in the first offset information and a second offset that is indicated in the second offset information.

5. The UE of claim 2, wherein the first offset information comprises a list of offsets, the second offset information comprises an index for offset, and determining the slot offset comprises:
  determining the slot offset as an offset in the list that corresponds to the index for offset.

6. The UE of claim 1, wherein determining the sequence of available slots comprises:
  determining each slot as an available slot.

7. The UE of claim 1, wherein determining the sequence of available slots comprises:
  determining whether a slot has a duplexing direction conflict; and
  based on a determination that the slot does not have the duplexing direction conflict, determining the slot as an available slot.

8. The UE of claim 1, wherein determining the sequence of available slots comprises:
  determining whether a slot has a duplexing direction conflict or a PHY channel/signal conflict; and
  based on a determination that the slot does not have either the duplexing direction conflict or the PHY channel/signal conflict, determining the slot as an available slot.

9. The UE of claim 7, wherein determining the sequence of available slots is at least based on a change in duplexing direction for one or more slots.

10. The UE of claim 9, wherein the change in duplexing direction is conducted via a Radio Resource Control (RRC) and/or a System Information Block (SIB).

11. The UE of claim 1, wherein the AP-SRS transmission has one or more SRS symbols to be transmitted in a slot, and determining the sequence of available slots is at least based on a conflict between the one or more SRS symbols with one or more symbols of the slot.

12. The UE of claim 11, wherein determining the sequence of available slots comprises:
  determining the slot as not an available slot if each of the one or more SRS symbols has a conflict with a respective symbol in the slot; or
  determining the slot as not an available slot if at least one of the one or more SRS symbols has a conflict with a respective symbol in the slot.

13. The UE of claim 11, wherein the conflict of an SRS symbol comprises at least one of:
  the SRS symbol colliding with a downlink (DL) symbol; or
  the SRS symbol colliding with a Flexible symbol.

14. The UE of claim 2, wherein the DCI comprising the second offset information is at least one of:
  an uplink (UL) DCI Format 0_1, 0_2;
  a downlink (DL) DCI Format 1_1, 1_2; or
  a special DCI Format 2_3;
  wherein the second offset information is comprised in the DCI by adding a new field to the DCI or by increasing bit width of an existing field of the DCI.

15. An apparatus for operating a user equipment (UE), the apparatus comprising:
  a processor configured to cause the UE to:
    receive an offset information associated with an Aperiodic Sounding Reference Signal (AP-SRS) transmission of the UE;
    determine a slot offset associated with the AP-SRS transmission, at least based on the offset information;
    determine a specific slot for the AP-SRS transmission, based on the determined slot offset by:
      determining a sequence of available slots counting from a reference slot; and
      determining the specific slot as a (t+1)-th available slot in the sequence of available slots, t representing the slot offset; and
    perform the AP-SRS transmission in the specific slot,
    wherein a width of the reference slot is based on at least one of a Subcarrier Spacing (SCS) of a Downlink Control Information (DCI) or a SCS of the AP-SRS.

16. A method for operating a user equipment (UE), the method comprising:
  receiving an offset information associated with an Aperiodic Sounding Reference Signal (AP-SRS) transmission of the UE;
  determining a slot offset associated with the AP-SRS transmission, at least based on the offset information;
  determining a specific slot for the AP-SRS transmission, based on the determined slot offset by:
    determining a sequence of available slots counting from a reference slot; and
    determining the specific slot as a (t+1)-th available slot in the sequence of available slots, t representing the slot offset; and
  performing the AP-SRS transmission in the specific slot,
  wherein a width of the reference slot is based on at least one of a Subcarrier Spacing (SCS) of a Downlink Control Information (DCI) or a SCS of the AP-SRS.

17. The method of claim 16, wherein determining the sequence of available slots comprises:
  determining whether a slot has a duplexing direction conflict; and
  based on a determination that the slot does not have the duplexing direction conflict, determining the slot as an available slot.

18. The method of claim 16, wherein the AP-SRS transmission has one or more SRS symbols to be transmitted in a slot, and determining the sequence of available slots is at least based on a conflict between the one or more SRS symbols with one or more symbols of the slot.

19. The method of claim 16, wherein determining the sequence of available slots is at least based on a change in duplexing direction for one or more slots.

20. The method of claim 16, wherein determining the sequence of available slots comprises:
  determining whether a slot has a duplexing direction conflict or PHY channel/signal conflict; and
  based on a determination that the slot does not have either the duplexing direction conflict or the PHY channel/signal conflict, determining the slot as an available slot.

* * * * *